UNITED STATES PATENT OFFICE.

CURTIS S. CUMMINGS AND CHARLES A. SHANK, OF GLOVERSVILLE, NEW YORK; SAID SHANK ASSIGNOR TO SAID CUMMINGS.

MANUFACTURE OF PAPER OR PASTEBOARD.

SPECIFICATION forming part of Letters Patent No. 279,350, dated June 12, 1883.

Application filed August 14, 1882. (Specimens.)

*To all whom it may concern:*

Be it known that we, CURTIS S. CUMMINGS and CHARLES A. SHANK, of Gloversville, in the county of Fulton and State of New York, have invented a new and useful Improvement in the Manufacture of Paper or Pasteboard, of which the following is a full, clear, and exact description.

This invention has for its object the utilization of the refuse scrap and the finishing-dust, or either, of leather tanned in oil or other liquor, such as buckskin and other leather used in the manufacture of gloves and mittens.

The invention consists in a novel process or method of treating such leather scrap or waste, whereby it is made into a pulp, which may either be used separately or be mixed with straw or other vegetable matter for rolling into paper or pasteboard, or for pressing into box or other shape, and which, combining cheapness with softness and toughness, may be used to advantage as a substitute for straw and other paper or board. The method of proceeding is essentially as follows: We take the buckskin or other leather scrap or waste, and for each ton, or thereabout, first subject it to a preparation or bath consisting of sixty-four gallons of water, (more or less,) four pounds chloride of lime, or thereabout, and about four ounces carbolic acid, and allow it to remain therein twenty-four hours, (more or less,) for the purpose of removing the color and cleaning the material. We then expose the mass to a drench of potash and lime-water, made, say, in the proportion of one and one-half pound of chloride of potash to sixty-four gallons of water and one bushel of stone-lime; or these proportions may be more or less changed. This removes the glue contained in the scrap. The mass may then be ground in an iron or other mill, but before or after grinding we subject it to a drench consisting of about four pounds of concentrated potash to sixty-four gallons of water, (more or less,) for the purpose of killing the animal matter contained in the skin or scrap, and afterward drench in pure water to remove the lye and other foreign matter. The grinding of the material is effected while the same is wet, after which it may be spread on kiln-cloths to dry, or the drying may be dispensed with and the mass be rolled into paper or board at once in any ordinary or suitable paper or board machine; or, instead of rolling into paper or pasteboard sheets, the pulp may be put into molds and pressed into seamless paper or pasteboard butter, glove, and other boxes, oyster and other pails, and various articles for which paper or pasteboard made from other pulp is used.

A paper or pasteboard thus made will be found superior to straw paper or pasteboard, both in looks and strength, although it may be mixed with straw and in the proportion of one half, (more or less,) if desired; or it may be used clear, with varied hardness, and will be found cheaper than straw and superior to it for making seamless boxes and numerous other articles.

Having thus fully described our invention, we claim as new and desire to secure by Letters Patent—

1. In a process of treating leather scrap or waste preparatory to grinding it for converting it into pulp to make paper or pasteboard, subjecting said material to a bath of water, chloride of lime, and carbolic acid, substantially as and for the purpose herein set forth.

2. In the treatment of leather scrap or waste for making paper or pasteboard pulp, first subjecting the material to a bath of water, chloride of lime, and carbolic acid, and afterward to a drench of lime-water and chloride of potash, essentially as and for the purposes specified.

3. In the manufacture of paper or pasteboard pulp from leather-scrap, subjecting the mass to a drench of concentrated potash and water, substantially as and for the purpose described.

4. In the manufacture of paper or pasteboard from leather scrap or waste, subjecting said scrap to a bath of water, chloride of lime, and carbolic acid, and to successive drenches of lime-water with potash, concentrated potash with water, and rinsing water or liquid, and grinding the mass to form into a pulp, either for use separately or combined with straw or other vegetable matter, essentially as herein specified.

CURTIS S. CUMMINGS.
CHARLES A. SHANK.

Witnesses:
JOHN J. STOLLER,
PHILIP KECK.